United States Patent Office 3,088,965
Patented May 7, 1963

---

3,088,965
PYROPHOSPHONIC ACID ESTERS AND PROCESS FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed Apr. 5, 1960, Ser. No. 20,009
Claims priority, application Germany Apr. 9, 1959
4 Claims. (Cl. 260—461)

The present invention relates to and has as its objects new and useful pyrophosphonic acid esters and processes for their production. The new compounds of this invention which are very effective insecticides may be represented by the following general formula

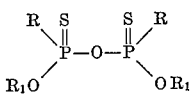

wherein R and R₁ stand for alkyl radicals.

Dithiopyrophosphoric acid esters are already known from the literature, e.g. from German patent specification 848,812. These esters may be obtained by reacting any dialkyl-thionophosphoric acid chlorides in the presence of about stoichiometric amounts of water, with pyridine or other alkaline compounds as can be seen from the following reaction scheme:

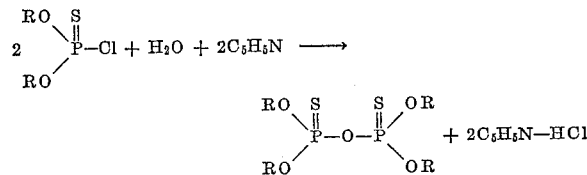

It has now been found that this reaction may also be applied to the alkyl-thionophosphonic acid-O-alkyl ester chlorides. New phosphonic acid compounds are then obtained of the above general formula.

Compared with the dithio-pyrophosphoric acid esters the new dithio-pyrophosphonic acid esters possesses a higher thermal stability and also a greater stability against hydrolizing agents. Some of the dithio-pyrophosphonic acid esters are superior to the corresponding phosphoric acid esters with respect to the insecticidal activity.

As an example for the special utility of the present compounds the ester of the following formula

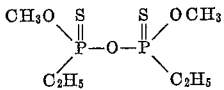

has been tested against flies. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The test has been carried out as follows: About 50 flies (Musca domestica) have been placed under covered petri dishes in which drip wet filter paper had been placed and which was sprayed with an insecticidal solution of a concentration as shown below and prepared as stated above. The living status has been determined after 24 hours. Flies were killed completely with 0.00001% solutions.

The following examples are given for the purpose of illustrating the present invention.

Example 1

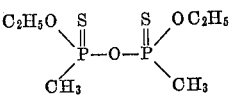

80 grams (0.5 mol) of methyl-thionophosphonic acid-O-ethyl ester chloride (B.P. 60° C./12 mm. Hg) are placed in a flask fitted with an agitator. A mixture of 40 grams of pyridine and 4.5 grams of water are added thereto with stirring. The reaction temperature rises to 50° C. The temperature is kept for 4 hours. The reaction product is then taken up in 200 cc. of benzene. The benzene solution is washed with dilute hydrochloric acid and then with water and dried. Upon fractionation, there are obtained 32 grams of dithio-methyl-pyrophosphonic acid ethyl ester of B.P. 74° C./0.01 mm. Hg. Yield 49% of the theoretical. Toxicity on rats per os 5 mg./kg. LD₅₀.

By exactly the same way there may be obtained the following ester:

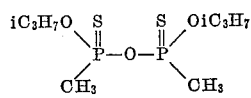

Example 2

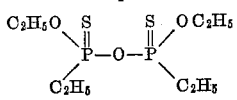

87 grams (0.5 mol) of ethyl-thionophosphonic acid-O-ethyl ester chloride (B.P. 48° C./1 mm. Hg) are placed in a flask fitted with an agitator. A mixture of 40 grams of pyridine and 4.5 grams of water are added dropwise with stirring. The temperature spontaneously rises to 50° C. The reaction product is kept at 50° C. for a further 4 hours and then worked up as indicated in Example 1. In this manner 47 grams of dithio-ethyl-pyrophosphonic acid ethyl ester of B.P. 84° C./0.01 mm. Hg are obtained. Yield 65% of the theoretical. Toxicity on rats per os 10 mg./kg. LD₅₀.

By exactly the same way there may be obtained the ester of the following formula:

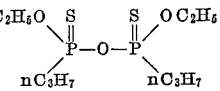

Example 3

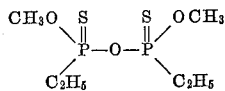

80 grams (0.5 mol) of ethyl-thionophosphonic acid-O-methyl ester chloride (B.P. 44° C./ mm. Hg) are placed in a flask fitted with an agitator. A mixture of 40 grams of pyridine and 4.5 grams of water are added dropwise with stirring. The temperature rises to 45–50° C. The reaction product is kept at 50° C. for a further 4 hours and then worked up as described in Example 1. In this manner, 22 grams of dithio-ethyl-pyrophosphonic acid methyl ester of B.P. 69° C./0.01 mm. Hg are obtained. Yield 34% of the theoretical. Toxicity on rats per os 10 mg./kg. LD₅₀.

I claim:
1. A compound of the following general formula

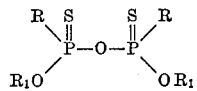

wherein R and R₁ stand for alkyl radicals up to 4 carbon atoms.

2. The compound of the following formula

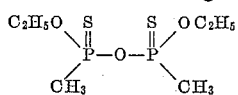

3. The compound of the following formula

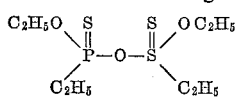

4. The compound of the following formula

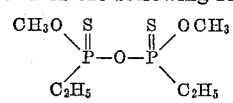

References Cited in the file of this patent

UNITED STATES PATENTS

| | | |
|---|---|---|
| 2,566,194 | Hagemeyer et al. | Aug. 28, 1951 |
| 2,923,729 | Hardy | Feb. 2, 1960 |
| 2,944,075 | Debo | July 5, 1960 |
| 2,951,088 | Debo | Aug. 30, 1960 |
| 2,952,701 | McConnell et al. | Sept. 13, 1960 |
| 2,965,666 | Debo | Dec. 20, 1960 |
| 3,020,198 | Fearing et al. | Feb. 6, 1962 |

OTHER REFERENCES

Recommended Common Names for Pesticides, British Standards House, British Standards Institution, 1957, 2 Park St., London, pages 24–25.

Coe et al.: J. Chem. Soc. (1957), pages 3604–3607.

Borecki et al.: J. Chem. Soc. (1958), pages 4081–4085.

Chem. Abst., vol. 53, col. 10013–10014 (June 10, 1959).